May 19, 1959     H. A. TOULMIN, JR     2,887,454
LIGHT WEIGHT MAGNET AND METHOD OF MAKING
Filed Nov. 28, 1952     2 Sheets-Sheet 1

INVENTOR.
HARRY A. TOULMIN JR.
BY
ATTORNEYS

May 19, 1959  H. A. TOULMIN, JR  2,887,454
LIGHT WEIGHT MAGNET AND METHOD OF MAKING
Filed Nov. 28, 1952  2 Sheets-Sheet 2
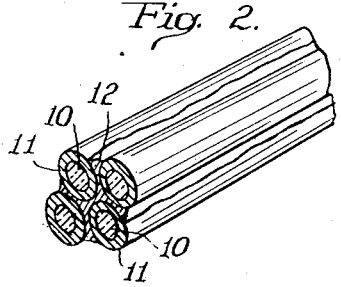
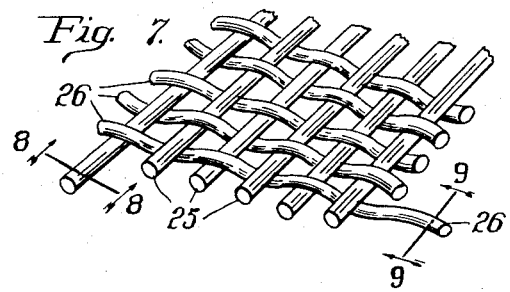
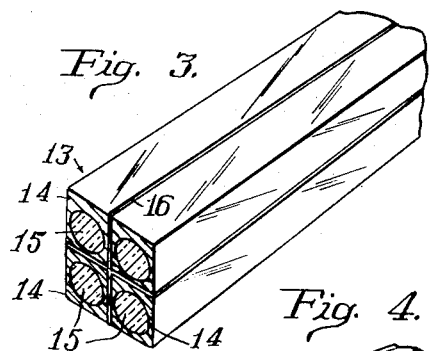
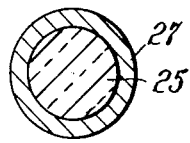
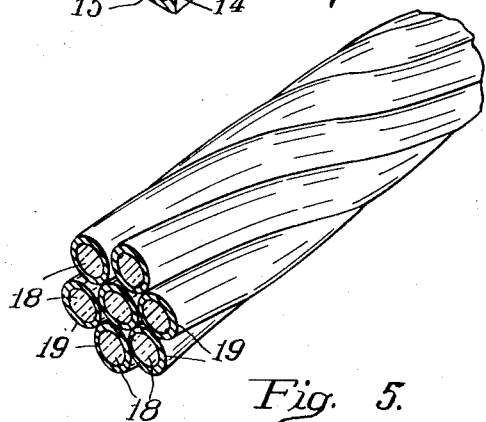
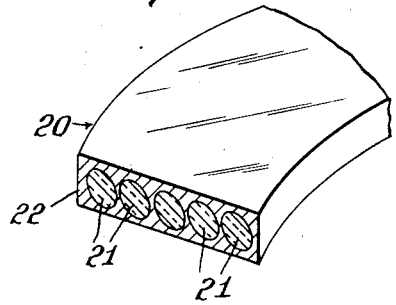
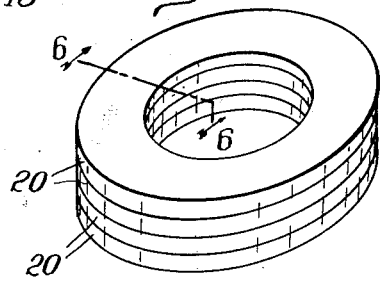
Inventor
H. A. Toulmin Jr.
By
Attorneys

United States Patent Office 2,887,454
Patented May 19, 1959

2,887,454
LIGHT WEIGHT MAGNET AND METHOD OF MAKING

Harry A. Toulmin, Jr., Dayton, Ohio, assignor to The Commonwealth Engineering Company of Ohio, Dayton, Ohio Application November 28, 1952, Serial No. 323,084

3 Claims. (Cl. 252—62.5)

This invention relates to magnets and magnetic structures and methods of producing the same. The invention more particularly appertains to light weight magnets for use as permanent magnets or electromagnets.

In the development and utilization of electronics and electronic equipment there has been an increasing demand for a light weight magnet or magnetic structure of high quality and magnetic efficiency for use in electronic devices. A light weight magnet of the character of this invention can be utilized in various types of electrical equipment, for example, radio and sound making and recording devices, loud speakers, head phones, hearing aids and radio detecting and measuring devices, control equipment, particularly temperature control devices, magnetic separators, magnetic chucks and the like, as well as other applications requiring the use of magnets.

In such electrical apparatus the magnet forms an essential element. Moreover, in conventional equipment magnets or magnetic actuators constitute about 40% of the weight of the device. This becomes of considerable importance in connection with aircraft and airborne instruments and equipment. For instance, it has been found that about 35% of the weight of a modern air craft is accounted for by the instruments. In conventional electronic instruments 35 to 40% of the weight of the instrument is in the magnets. It will, therefore, be seen that a magnet of light weight which is durable and efficient for such instruments is very much desired.

It is an object of the present invention to produce a light weight magnet or magnetic structure of this character which may be utilized as a permanent magnetic element or as an electro-magnet.

It is a further object of this invention to provide an improved method of making a light weight magnet or magnetic structure which can be readily used in the manufacture and fabrication of electrical instruments and electrical devices and equipment.

It is another object to produce a light weight magnet by depositing magnetic metal or magnetizable material on to the surface of inorganic fibers, such as glass fibers, mineral wool fibers and the like inorganic filaments, and binding the same together by a suitable binder, such as thermo-plastic resin or other suitable moldable material, and magnetizing the structure to form a compact light weight magnet.

Another object of the invention is to provide a light weight magnet which comprises glass fibers coated with a magnetizable material, the coated glass fibers being bound together with a suitable binder, such as natural or synthetic resins, and molded to any desired shape, and magnetized to form a magnet.

Still another object of the invention is to provide a process for the manufacture of magnetic structures which may be suitably shaped and assembled in an electrical instrument and used as a permanent magnet.

Still another object is to provide a process for manufacturing magnetic structures by gas plating a metal, or alloy capable of being magnetized, on to the surface of glass fibers and before or after assembling the fibers, magnetizing the same to form a magnet.

These and other objects and advantages of the invention will be apparent from the following description taken in conjunction with the accompanying drawings in which:

Figure 2 is a perspective view, partly broken away, illustrating a fagot of glass fibers coated with magnetizable material, the fibers being shown in cross section and illustrated as bound together by a resinous binder;

Figure 3 is a perspective view, partly broken away, of a moldable fagot of glass fibers coated with magnetizable material as illustrated in Figure 2, the same being molded or otherwise shaped into the form of a bar magnet;

Figure 4 is a similar perspective view and shown in cross section, of a bundle of glass fibers coated with magnetizable material, the fibers being twisted together in the form of a rope or multiple strand structure;

Figure 5 is a perspective view of a built-up coil structure formed of superimposed layers of glass fibers coated with magnetizable material and forming an electromagnetic coil;

Figure 6 is an enlarged cross sectional view taken through a portion of the coil illustrated in Figure 5, and taken substantially on the line 6—6;

Figure 7 is a perspective view illustrating a woven fabric made up of glass fibers coated with magnetizable material;

Figure 8 is an enlarged sectional view taken on the line 8—8 of Figure 7, and

Figure 9 is a similar enlarged sectional view taken on the line 9—9 of Figure 7.

Figure 1:
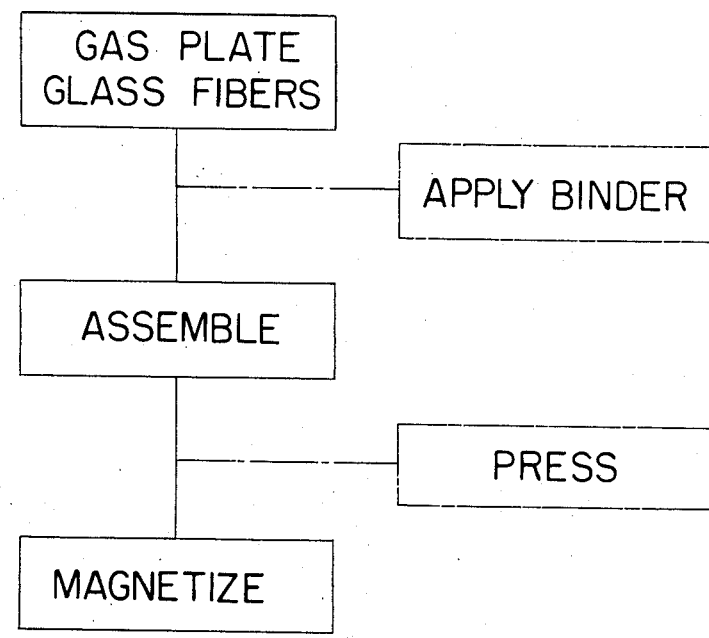
Figure 1 is a flow sheet illustrating schematically a suitable method for making a light weight magnet utilizing glass fibers, in accordance with this invention.

The invention will be described more particularly in connection with the use of glass fibers as a supporting base for the magnetizable material, but, it will be understood that in place of glass fibers, other materials, such as mineral wool, asbestos fibers or other suitable fibers may be used, and such as will withstand molding or shaping and magnetization, as required to form a magnet or magnetic structure of the desired shape and dimensions.

In accordance with a preferred method of making the light weight magnetic structures of this invention, glass fibers are first plated or coated with a magnetizable material, such as nickel, iron, or magnet-alloy metal or the like. To the plated glass fibers is then applied a binder such as a thermo-plastic resin and the fiber-metal mass assembled and pressed together in a mold to form a magnetic structure of the desired shape. The magnetizable fibers may then be subjected to magnetization by heating the same to a temperature sufficient to soften the magnetizable metal in the presence of a strong magnetic field, the latter being utilized to align the particles to produce a final product having a high degree of magnetism. The temperature employed in each instance will vary, depending upon the magnetizable material used to coat the fibers. Where the magnetizable material deposited on the glass fibers consists of iron or nickel, the metal may be suitably deposited on the fibers by gas plating.

A method of producing glass fibers coated with magnetic material is illustrated schematically by the flow sheet of Figure 1.

In order to produce a multiple-strand, fagot or bundle of magnetizable glass fibers, which forms a useful magnetic structure, a plurality of these fibers comprising an outer layer of magnet-metal are suitably bound together with a binder and molded to the desired shape. As a suitable binder, synthetic resins and the like, may be employed, for example, phenol formaldehyde and urea formaldehyde resins, cellulose solutions, and similar cemetitious substances. In place of synthetic resins, natural resinous material may be employed, e.g. manila gum, rosin or ester gum. Inorganic binders, e.g. alkali metal silicates also may be utilized. Magnetic structures formed of fibers and magnetizable material bonded together are illustrated in Figures 2 through 9.

Referring to Figures 2 to 9 inclusive, and particularly Figures 2 to 5, magnet shapes fabricated from glass fibers coated with magnetic material are illustrated, the structural features thereof being enlarged for clearness. Reference character 10 designates a glass fiber having a coating 11 of magnetizable metal, for example, nickel, iron, or the like magnetic metal or a suitable alloy. Individual strands of glass fiber are coated with magnetizable metal, thus forming a metal shell having a glass fiber core, the strands being suitably bound together by a binder, as indicated at 12.

Figure 3 illustrates a rectangular shaped bar magnet portion, the magnet being made of a plurality of bars 13 formed of magnet-metal 14 having a central portion made up of glass fibers 15. The magnetic metal, if desired, may be in the form of small particles or powder and compressed about the glass fiber. A number of bars are then assembled to provide a desired shape, such as illustrated in Figure 3, the bars being suitably bound together by the application of binder, as at 16, and molded to form a structure having, for example, a rectangular or square-shaped cross section.

Figure 4 shows a twisted-strand structure comprising a plurality of glass fiber strands 18 coated with magnetizable metal 19, the strands in this instance being twisted about each other and forming a cable or rope, a binder being dispensed with in this structure.

Figures 5 and 6 illustrate a coil structure which is made up of a plurality of super imposed rings or coils 20 formed of glass fibers 21 coated or embedded in magnetizable metal 22. In this structure the glass fibers comprise layers made up of matted or felted fibers which form a base for receiving the magnetizable metal, the assembled glass fibers being coated as a unit rather than as individual fibers.

Figure 7 illustrates a woven fabric formed of strands of glass fibers 25 and 26 constituting the warp and woof fibers respectively, the fibers being preferably coated with a magnetizable material 27. An enlarged cross-section of the thus coated fibers is illustrated in Figure 8.

In Figure 9, a modification is illustrated wherein the woof fibers are coated with resin or dielectric material, whereas the warp fibers or strands 25 are coated with magnet-metal as described.

In the structures described the glass fibers may be preplated or coated with a magnetizable material and these individually coated glass fibers assembled and formed into the desired magnet shape, or the glass fibers may be first formed into a mat or felt of the desired shape and the magnetizable material placed onto the surface of the mat or felt formed of glass fibers. As another alternative, the magnetizable material may be applied to selected fibers or strands and assembled to form a unitary magnetic structure. A suitable method of gaseous plating carbonyl metal, e.g. iron, nickel and the like magnetizable metal, is described in U. S. Patent 2,332,309, which method may be used to apply the magnetic metal to glass fibers.

The magnetizable material used to coat the glass fibers may comprise such materials as are commonly utilyzed for making permanent magnets. For example, nickel, soft iron, or alloys such as iron-base alloys containing aluminium, nickel and cobalt as principal alloying elements. Other magnetic alloys, found suitable, comprise an alloy containing about 12% aluminium, 18% nickel and 70% iron. Also, iron base alloys containing 10 to 20% nickel, 14 to 30% cobalt, 6 to 11% aluminium, and copper up to 7% and titanium up to 5% are useful. These alloys may contain small quantities of carbon, silicon and manganese, as is usual in permanent magnetic alloys.

Where the magnetizable material is not readily adapted to be gas plated onto the glass fibers, the same in the form of powder may be compacted about the fibers and/or bound thereto by the addition of resin or other suitable binder. Magnetic manganese bismuthide, known as Bismanol, may be utilized to form a permanent magnet by compacting the powdered magnetic alloy about glass fibers, preferably being hot pressed at a temperature of about 275 to 300° C. in the presence of a magnetic field. The strength of the magnetic field employed is sufficient to bring about the desired magnetic alignment of the alloy particles. Heat treatment of the magnet-metals or alloys in a magnetic field produces marked improvement of the magnetic metals having high-temperature Curie points.

In the making of glass fiber base magnets using magnetic metal powder and binder, such as phenol formaldehyde resin, the binder is mixed with powdered magnetic metal and compressed cold or while in thermoplastic state to the shape desired. If desired, the compression molding may be carried out in two steps. For example, an initial cold pressing treatment is followed by the application of heat and pressure. A final heat-treatment of the molded shape in a suitable furnace may be employed to harden the magnetic structure and provide an improved magnet.

Fine powders of the alloy or magnetic material may be obtained by gaseous deposition, and the metal powder mixed with binder and glass fibers, as described, and the mass pressed to the desired shape, the shaped product may then be magnetized and used as a permanent magnet.

Electro-magnets may also be fabricated utilizing glass fibers or the like inorganic dielectric material coated with magnetizable metal or alloy similarly as described for making permanent magnets.

In lieu of the resinous binders mentioned, unsaturated polyester type alkyds may be employed. Copolymerized vinyl and allyl type monomers which are useful resinous binders are disclosed, for example, in U. S. Patents Nos. 2,555,313 and 2,443,741. Further, where it is desired to utilize a fireproof resinous binder, a melamineformaldehyde resin, such as described in U. S. Patent No. 2,603,037, may be utilized.

The structures illustrated in Figures 3 to 9 may comprise pole-piece members for forming suitable magnetic structures. Where close tolerances are required the molded magnetizable material may be machined after molding to form an accurately shaped pole-piece or magnet. The invention contemplates the manufacture of glass fibers coated with magnetizable material which may be marketed as an intermediate product for use in the production of light weight magnets in the fabrication of electronic instruments or equipment, as well as permanent or electro-magnets.

The invention is particularly useful in the manufacture of various electronic products and mechanism utilizing magnetic structures. The method of making magnetic structures may also be employed to prepare magnetic materials which are supported on a base of inorganic fibers per se or as a felted or matted mass, and which is of lighter weight than the magnetizable material.

It is to be understood that the illustrations and description of magnetizable materials set out hereinabove serve to typify the invention and are not to be considered as limitations thereof, except as set forth in the following claims.

What is claimed is:

1. A method of making a lightweight magnetic core which comprises the steps of providing strands of glass fiber, subjecting said strands to gas plating with a heat-decomposable metal compound, assembling multiple strands of glass fiber thus gas plated, heating the plated strands in the presence of a strong magnetic field, and shaping the resultant magnetized assemblage of strands into a magnetic core.

2. A method of making a lightweight magnetic core which comprises the steps of providing strands of glass fiber, subjecting said strands to gas plating with a heat-decomposable metal compound, assembling multiple strands of glass fiber thus gas plated, heating the plated strands to a temperature sufficient to soften the metal in the presence of a strong magnetic field, and shaping the resultant magnetized assemblage of strands into a magnetic core.

3. A magnetic core for use with magnetic fluxes comprising a plurality of elongated magnetic filaments arranged generally parallel to the magnetic path of the core, and bonded together to provide a substantially solid magnetic mass, said magnetic filaments comprising an outer shell of metal of uniform thickness and a core of glass, the filaments being bonded to said glass to form an integral lightweight magnetizable product.

References Cited in the file of this patent
UNITED STATES PATENTS

| | | |
|---|---|---|
| 1,031,616 | Benrath | July 2, 1912 |
| 1,868,327 | Kramer | July 19, 1932 |
| 1,930,788 | Buckner | Oct. 17, 1933 |
| 2,011,697 | Vogt | Aug. 20, 1935 |
| 2,034,608 | Taylor | Mar. 17, 1936 |
| 2,041,480 | Oexmann | May 19, 1936 |
| 2,251,913 | Brennan | Aug. 12, 1941 |
| 2,443,756 | Williams | June 22, 1948 |
| 2,616,165 | Brennan | Nov. 4, 1952 |
| 2,682,021 | Elmem | June 22, 1954 |